(12) United States Patent
Agmon et al.

(10) Patent No.: US 7,596,088 B2
(45) Date of Patent: Sep. 29, 2009

(54) ROUTE SELECTION WITH BANDWIDTH SHARING OPTIMIZATION OVER RINGS

(75) Inventors: Gideon Agmon, Kfar-Sava (IL); Yossi Barsheshet, Ashdod (IL)

(73) Assignee: Corrigent Systems Ltd., Tel Aviv (IL)

( * ) Notice: Subject to any disclaimer, the term of this patent is extended or adjusted under 35 U.S.C. 154(b) by 91 days.

(21) Appl. No.: 11/339,148

(22) Filed: Jan. 24, 2006

(65) Prior Publication Data

US 2007/0171832 A1    Jul. 26, 2007

(51) Int. Cl.
*H04J 3/14* (2006.01)
(52) U.S. Cl. .................. 370/230; 370/229; 370/328; 370/338; 370/400
(58) Field of Classification Search .......... 370/238, 370/404, 230, 395.5, 328, 338
See application file for complete search history.

(56) References Cited

U.S. PATENT DOCUMENTS

| | | | |
|---|---|---|---|
| 5,634,006 | A | 5/1997 | Baugher et al. |
| 6,147,993 | A | 11/2000 | Kloth et al. |
| 6,151,297 | A | 11/2000 | Congdon et al. |
| 6,314,110 | B1 | 11/2001 | Chin et al. |
| 6,507,577 | B1 | 1/2003 | Mauger et al. |
| 6,522,627 | B1 | 2/2003 | Mauger et al. |
| 6,553,029 | B1 | 4/2003 | Alexander |
| 6,665,273 | B1 | 12/2003 | Goguen et al. |
| 6,735,198 | B1 | 5/2004 | Edsall et al. |
| 6,778,494 | B1 | 8/2004 | Mauger et al. |
| 6,785,226 | B1 | 8/2004 | Oltman et al. |
| 6,788,681 | B1 | 9/2004 | Hurren et al. |
| 6,795,394 | B1 * | 9/2004 | Swinkels et al. ............ 370/222 |
| 6,952,395 | B1 | 10/2005 | Manoharan et al. |
| 7,035,279 | B2 | 4/2006 | Bruckman et al. |
| 7,065,044 | B2 * | 6/2006 | Wang et al. .................. 370/229 |
| 7,092,356 | B2 * | 8/2006 | Rabie et al. .................. 370/230 |
| 7,212,490 | B1 | 5/2007 | Kao et al. |
| 7,248,561 | B2 * | 7/2007 | Ishibashi et al. ............. 370/228 |
| 7,260,097 | B2 | 8/2007 | Casey et al. |
| 2002/0024974 | A1 | 2/2002 | Karagiannis et al. |
| 2002/0118700 | A1 | 8/2002 | Bruckman |
| 2002/0176371 | A1 | 11/2002 | Behzadi |
| 2003/0009594 | A1 | 1/2003 | McElligott |
| 2003/0074469 | A1 | 4/2003 | Busi et al. |

(Continued)

OTHER PUBLICATIONS

The IEEE Standard 802.17 working group, available at www.ieee802.org/17.

(Continued)

*Primary Examiner*—Kevin C Harper
*Assistant Examiner*—Henry Baron
(74) *Attorney, Agent, or Firm*—Darby & Darby P.C.

(57) ABSTRACT

A method for establishing a connection through a communication network that includes multiple segments includes providing a sharing definition defining a sharing of bandwidth among connections in the network. Two or more candidate routes for a new connection to be established through the network are identified. For each of the two or more candidate routes, a cumulative additional bandwidth reservation to be allocated to the new connection in the segments along the candidate route is calculated responsively to the sharing definition. A preferred route having a minimum value of the cumulative additional bandwidth reservation is selected out of the two or more candidate routes. The new connection is established using the preferred route.

20 Claims, 2 Drawing Sheets

U.S. PATENT DOCUMENTS

| | | |
|---|---|---|
| 2003/0103449 A1 | 6/2003 | Barsheshet et al. |
| 2003/0147345 A1 | 8/2003 | Takagi et al. |
| 2003/0152025 A1 | 8/2003 | Andersson et al. |
| 2003/0154315 A1 | 8/2003 | Sultan et al. |
| 2003/0202476 A1* | 10/2003 | Billhartz et al. ............. 370/236 |
| 2003/0227919 A1 | 12/2003 | Zelig et al. |
| 2004/0022268 A1 | 2/2004 | Busi et al. |
| 2004/0107285 A1 | 6/2004 | Larson et al. |
| 2004/0156313 A1 | 8/2004 | Hofmeister et al. |
| 2004/0170184 A1 | 9/2004 | Hashimoto |
| 2004/0208554 A1 | 10/2004 | Wakai et al. |
| 2004/0228278 A1 | 11/2004 | Bruckman et al. |
| 2005/0010685 A1 | 1/2005 | Ramnath et al. |
| 2005/0129059 A1 | 6/2005 | Jiang et al. |
| 2005/0180171 A1 | 8/2005 | Huang et al. |
| 2005/0226265 A1 | 10/2005 | Takatori |
| 2005/0249121 A1* | 11/2005 | Matsunaga ................. 370/238 |
| 2006/0176829 A1* | 8/2006 | McLaughlin et al. ........ 370/252 |
| 2008/0037988 A1 | 2/2008 | Bullock |

OTHER PUBLICATIONS

Rosen, et al., RFC 3031, "Multiprotocol Label Switching Architecture", Jan. 2001.

Andersson, et al., RFC 3036, "Label Distribution Protocol Specification", Jan. 2001.

Jamoussi, et al., RFC 3212, "Constraint-Based LSP Setup Using LDP", Jan. 2002.

Awduche, et al., RFC 3209, "RSVP-TE: Extensions to RSVP for LSP Tunnels", Dec. 2001.

Braden, et al., RFC 2205, "Resource ReSerVation Protocol (RSVP)-Version 1 Functional Specification", Sep. 1997.

Braden, et al., RFC 1633, "Integrated Services In The Internet Architecture: An Overview", Jun. 1994.

U.S. Appl. No. 11/305,486.

* cited by examiner

ROUTE SELECTION WITH BANDWIDTH SHARING OPTIMIZATION OVER RINGS

FIELD OF THE INVENTION

The present invention relates generally to communication networks, and particularly to methods and systems for selecting routes for communication connections that share bandwidth allocations in ring configurations.

BACKGROUND OF THE INVENTION

Communication networks sometimes comprise ring configurations. For example, some networks comprise Resilient Packet Ring (RPR) configurations, as defined by the IEEE 802.17 working group. Applicable standards and additional details regarding RPR network configurations are available from the Institute of Electrical and Electronics Engineers.

In some cases, connections are established over rings using tunneled protocols such as the Multiprotocol Label Switching (MPLS) protocol. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC, as well as other IETF RFCs cited hereinbelow, is available from the Internet Engineering Task Force (IETF). MPLS is also described by Andersson et al., in IETF RFC 3036 entitled "Label Distribution Protocol Specification" (January, 2001), which is incorporated herein by reference.

MPLS defines a label distribution protocol (LDP) by which one LSR informs another of the meaning of labels used to forward traffic between and through them. An extension of LDP for setting up constraint-based label switched paths (CR-LSPs) is referred to as CR-LDP and is defined by Jamoussi et al., in IETF RFC 3212 entitled "Constraint-Based LSP Setup using LDP" (January, 2002), which is incorporated herein by reference. CR-LDP provides support for constraint-based routing of traffic across the routed network. LSPs can be set-up based on explicit route constraints, quality of service (QoS) constraints and other constraints.

Another protocol used for setting up MPLS tunnels is RSVP-TE, which is described by Awduche et al., in IETF RFC 3209 entitled "RSVP-TE: Extensions to RSVP for LSP Tunnels" (December, 2001), which is incorporated herein by reference. RSVP-TE extends the well-known Resource Reservation Protocol (RSVP), allowing the establishment of explicitly-routed LSPs using RSVP as a signaling protocol. RSVP itself is described by Braden et al., in IETF RFC 2205 entitled "Resource ReSerVation Protocol (RSVP)—Version 1 Functional Specification" (September, 1997), which is incorporated herein by reference.

In some applications, network elements allocate resources such as bandwidth to the services they provide. For example, the IETF has proposed the Integrated Services (IntServ) protocol architecture as a framework for allocating different levels of Quality of Service (QoS) to different services. IntServ is described by Braden et al., in IETF RFC 1633 entitled "Integrated Services in the Internet Architecture: an Overview" (June, 1994), which is incorporated herein by reference.

SUMMARY OF THE INVENTION

Communication connections traversing a communication network are sometimes allowed to share bandwidth allocation in common network segments. For example, bandwidth-sharing connections may comprise connections that are set up to protect one another against failure of a network node or segment.

Some known routing protocols, such as the Open Shortest Path First (OSPF) or the Intermediate System to Intermediate System (IS-IS) protocols, as well as some known tunnel creation and reservation protocols, such as RSVP-TE and LDP, cited above, do not take into account the ability to share bandwidth allocations between different connections. As a result, the route selection carried out by such protocols is often non-optimal for cases in which bandwidth sharing is permitted.

Embodiments of the present invention provide improved methods and systems for establishing a connection through a communication network, taking into account the ability to share bandwidth between the new connection and existing connections. A sharing definition defines connections that may share their bandwidth allocations. In order to establish the new connection, two or more candidate routes through the network are identified. For each of the candidate routes, the disclosed methods and systems calculate the additional bandwidth reservation, accumulated over the network segments along the candidate route in question, which would be allocated to the new connection if it were established through this route.

The cumulative additional bandwidth reservation can be viewed as a measure of the amount of bandwidth that can be saved in a particular route due to bandwidth sharing. The candidate route having a minimum value of the cumulative additional bandwidth reservation is selected as a preferred route for establishing the new connection. Using the methods and systems described hereinbelow, higher network capacity and higher QoS can be achieved.

In some embodiments, the disclosed methods and systems are used to establish communication connections through ring configurations comprising two ringlets, often denoted a clockwise (CW) and a counter-clockwise (CCW) ringlet. In these embodiments, a ring-level connection admission control (CAC) module associated with the ring calculates the cumulative additional bandwidth reservation for each of the two ringlets. The ring-level CAC module then selects the ringlet having a minimum value of the cumulative additional bandwidth reservation as a preferred ringlet for establishing the new connection.

There is therefore provided, in accordance with an embodiment of the present invention, a method for establishing a connection through a communication network that includes multiple segments, including:

providing a sharing definition defining a sharing of bandwidth among connections in the network;

identifying two or more candidate routes for a new connection to be established through the network;

for each of the two or more candidate routes, calculating a cumulative additional bandwidth reservation to be allocated to the new connection in the segments along the candidate route, responsively to the sharing definition;

selecting a preferred route having a minimum value of the cumulative additional bandwidth reservation out of the two or more candidate routes; and establishing the new connection using the preferred route.

In an embodiment, at least some of the segments are arranged in a ring configuration, and identifying the two or more candidate routes includes identifying first and second routes traversing respective first and second ringlets of the ring configuration.

In another embodiment, establishing the new connection includes establishing a tunnel through the network in accordance with a tunnel-based communication protocol.

In yet another embodiment, the sharing definition states that the new connection may share the bandwidth with an existing connection traversing at least one common segment along the preferred route, and establishing the new connection includes sharing a bandwidth allocation in the at least one common segment between the new connection and the existing connection.

Additionally or alternatively, the new connection and the existing connection are established to protect one another against a failure in at least one of a network segment and a network node.

In an embodiment, providing the sharing definition includes distributing the sharing definition to nodes of the network using a reservation protocol.

In another embodiment, selecting the preferred route includes reverting to a lower priority route selection method when the calculated cumulative additional bandwidth reservation is equal for all of the two or more candidate routes.

There is additionally provided, in accordance with an embodiment of the present invention, a network node, including:

a network interface, which is arranged to communicate with other network nodes over a communication network that includes multiple segments; and a processor, which is arranged to accept a sharing definition defining a sharing of bandwidth among connections in the network, to identify two or more candidate routes for a new connection to be established through the network, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

There is also provided, in accordance with an embodiment of the present invention, a communication network, including:

a plurality of network segments;

a network node, including:

a network interface, which is arranged to communicate with other nodes in the network; and a processor, which is arranged to accept a sharing definition defining a sharing of bandwidth among connections in the network, to identify two or more candidate routes for a new connection to be established through the network, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

There is further provided, in accordance with an embodiment of the present invention, a computer software product used in a network node in a communication network that includes multiple segments, the product including a computer-readable medium, in which program instructions are stored, which instructions, when read by a computer, cause the computer to accept a sharing definition defining a sharing of bandwidth among connections in the network, to identify two or more candidate routes for a new connection to be established through the network, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

The present invention will be more fully understood from the following detailed description of the embodiments thereof, taken together with the drawings in which:

DETAILED DESCRIPTION OF EMBODIMENTS

Figure 1:
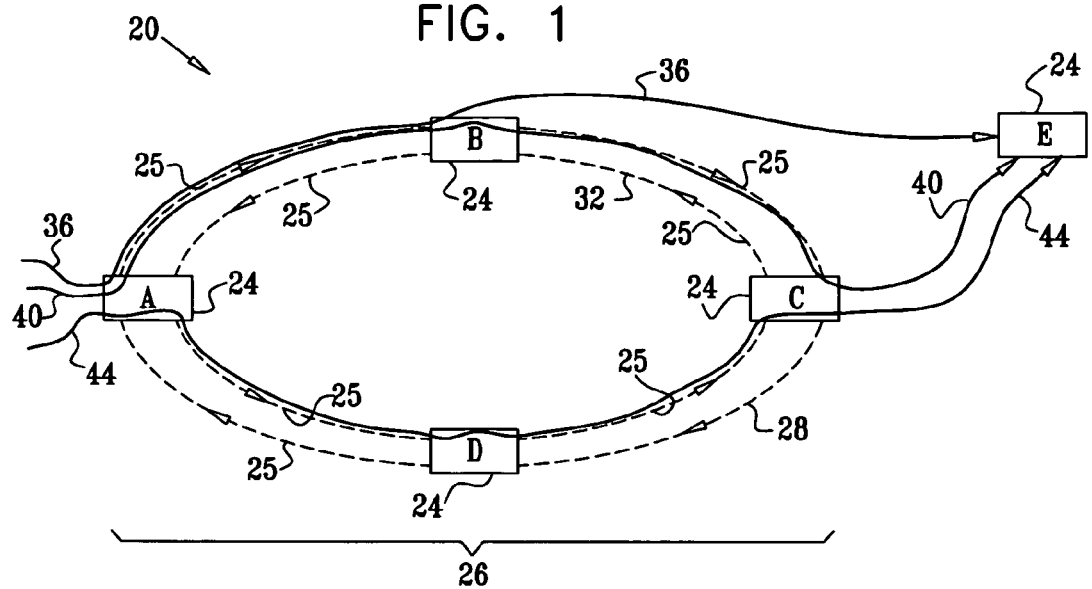
FIG. 1 is a block diagram that schematically illustrates a communication network, in accordance with an embodiment of the present invention.

FIG. 1 is a block diagram that schematically illustrates a communication network 20, in accordance with an embodiment of the present invention. Network 20 comprises multiple network nodes 24. The network nodes may comprise, for example, layer 2 switches, layer 3 routers, bridges, concentrators, aggregators and add/drop multiplexers (ADM). Nodes 24 are connected by network links, referred to as segments 25, which may comprise optical fiber links or any other suitable communication medium.

In the exemplary configuration of FIG. 1, four network nodes denoted A, B, C and D are arranged in a ring configuration 26, such as a resilient packet ring (RPR) configuration as defined in the IEEE 802.17 standard cited above. Ring 26 comprises two ringlets, namely a clockwise (CW) ringlet 28 and a counterclockwise (CCW) ringlet 32. Segments 25 that belong to ring 26 are referred to as ring segments.

A connection 36 has been previously defined via network 20 and in particular via ring 26. In the present example, connection 36 comprises a 100 Mbps connection (i.e., requiring a 100 Mbps bandwidth allocation in the segments along its route). The route of connection 36 enters ring 26 at node A and runs through clockwise ringlet 28 to node B. At node B the route leaves the ring and terminates at node E, which is located outside of ring 26.

Now consider a new 50 Mbps connection, which is to be established through network 20. Assume the new connection is required to enter ring 26 at node A, leave the ring at node C and terminate at node E. There exist two alternative routes for such a connection, corresponding to the two ringlets of ring 26. A first candidate route 40 enters ring 26 at node A and follows clockwise ringlet 28, traversing nodes B and C. At node C, candidate route 40 leaves the ring and terminates at node E. A second candidate route 44 enters ring 26 at node A and follows counterclockwise ringlet 32, traversing nodes D and C. At node C, candidate route 44 leaves ring 26 and terminates at node E.

Connection 36, as well as the new connection and the other connections described hereinbelow, may comprise MPLS label-switched paths (LSP), or MPLS tunnels, in accordance with the MPLS tunnel creation protocols cited above. Alternatively, the connections may be defined using any other suitable communication protocol, such as ATM tunnel creation protocols.

In some cases, the new connection may be allowed to share its bandwidth allocation with existing connection 36. For example, the new connection may be set up to protect the existing connection against failure of a node or segment along its route. In other cases, bandwidth may be allocated to connections with a certain degree of oversubscription. In other words, shared bandwidth may be allocated simultaneously to two or more connections, assuming that not all of these connections will actually use all of the allocated bandwidth simultaneously. Alternatively or additionally, connections may be defined as being allowed to share their bandwidth allocations for any other reason or purpose. In the exemplary configuration of FIG. 1, it is assumed that the new connection may share its 50 Mbps bandwidth allocation in the segments along its route with the 100 Mbps bandwidth allocation of existing connection 36.

Some known routing protocols, such as the Open Shortest Path First—Traffic Engineering (OSPF-TE) or the Intermediate System to Intermediate System—Traffic Engineering (IS-IS-TE) protocols, typically select routes for connections based on criteria such as minimum delay, minimum number of segments (hops), minimum cost and average or maximum available bandwidth. These known protocols generally do not take into account dependencies between the newly-established connection and previously-existing connections, such as the ability to share bandwidth allocation between the connections. Some known reservation protocols, such as RSVP-TE and LDP cited above, also do not enable sharing the bandwidth allocation among different connections.

The methods and systems described hereinbelow select one of the two candidate routes for establishing the new connection, so as to optimize the bandwidth allocation in ring 26. Unlike the known routing protocols noted above, these methods and systems take into account the ability to share bandwidth between the new connection and existing connections that traverse ring 26. In some embodiments, these methods and systems select a preferred route that achieves the smallest bandwidth allocation, taking into account bandwidth sharing. Thus, in the example shown in FIG. 1, route 40 will be selected. In contrast, algorithms and protocols known in the art may select route 44, because more bandwidth is available on the segments of this route, without regard to sharing considerations. Details of the process of route selection based on bandwidth sharing are explained below with reference to FIG. 4. As a result of bandwidth sharing, the capacity of ring 26 is significantly improved, enabling it to deliver more bandwidth at a given QoS or to deliver higher QoS at a given capacity.

In general, the bandwidth-sharing connections through ring 26 may have similar or different bandwidths. The connections may originate and terminate at the same nodes or at different nodes, either within or outside ring 26.

In the context of the present patent application and in the claims, the term "bandwidth" is used to refer to allocation of network capacity in accordance with any allocation scheme. Thus, allocated bandwidth may comprise, for example, guaranteed bandwidth (also referred to as committed information rate, or CIR), average bandwidth and/or peak bandwidth (also referred to as peak information rate, or PIR) provided only when available without hard guarantee.

Figure 2:
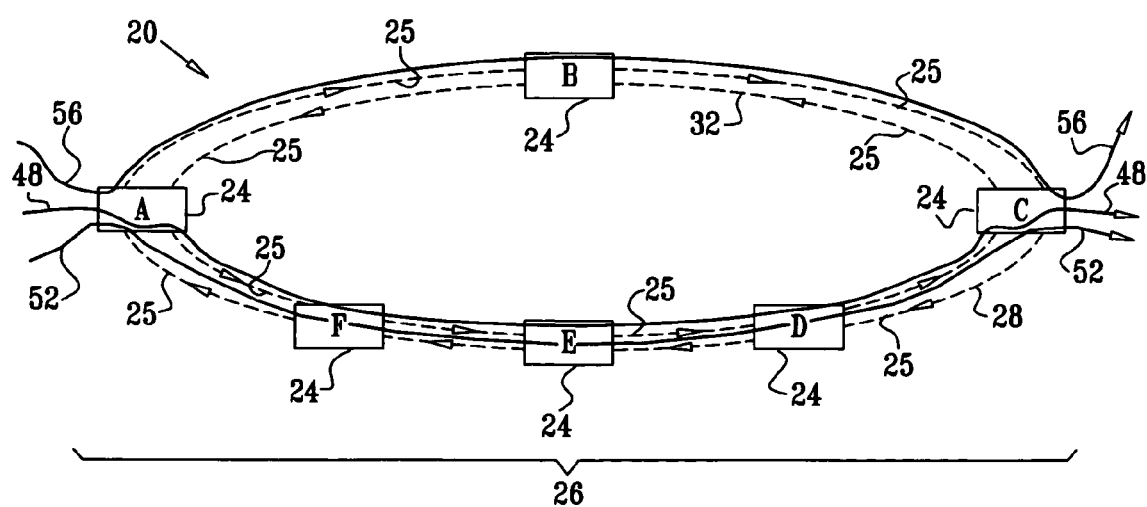
FIG. 2 is a block diagram that schematically illustrates a communication network, in accordance with another embodiment of the present invention.

FIG. 2 is a block diagram that schematically illustrates communication network 20, in accordance with another embodiment of the present invention. In the exemplary configuration of FIG. 2, ring 26 comprises six nodes 24 denoted A, B, C, D, E and F. A connection 48 is previously defined in the network. In the present example, connection 48 comprises a 1 Gbps connection (i.e., requiring a 1 Gbps bandwidth allocation in the segments along its route). The route of connection 48 enters ring 26 at node A, follows counterclockwise ringlet 32 through nodes F, E and D and leaves ring 26 at node C.

Consider another 1 Gbps connection, which is to be established through network 20. Assume the new connection is required to enter ring 26 at node A and leave at node C, and may share its bandwidth allocation with the existing connection 48. There exist two alternative routes for establishing the new connection. A first candidate route 52 follows the same route as the route of connection 48 via counterclockwise ringlet 32, traversing nodes A, F, E, D and C. A second candidate route 56 follows clockwise ringlet 28, traversing nodes A, B and C. As will be shown below, the disclosed methods and systems typically select route 52 so as to optimize the bandwidth allocation in nodes 24 of ring 26 based on bandwidth sharing.

The network configurations of FIGS. 1 and 2 above are exemplary configurations, shown purely for the sake of conceptual clarity. The methods and systems described herein can be used in other ring configurations, such as, for example, the Synchronous Optical Network (SONET) Bidirectional Line Switch Ring (BLSR) configuration. In general, although the embodiments described herein mainly address bandwidth sharing over rings, the disclosed methods and systems are in no way limited to ring configurations, and can be used to establish connections in any other suitable network configuration that includes multiple network nodes and segments.

Figure 3:
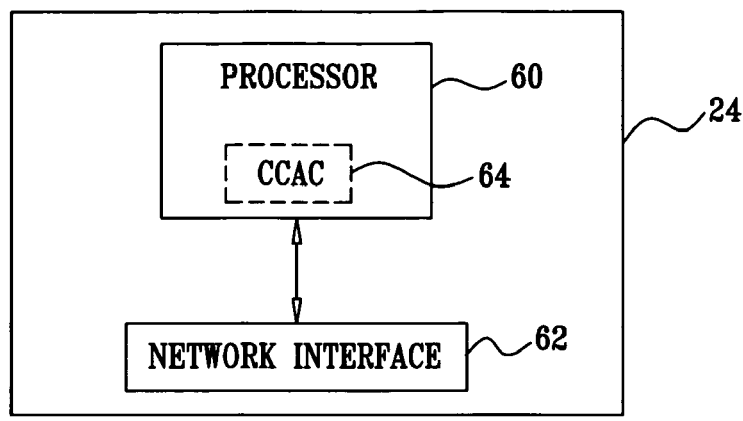
FIG. 3 is a block diagram that schematically illustrates details of a network node, in accordance with an embodiment of the present invention.

FIG. 3 is a block diagram that schematically illustrates details of network node 24, in accordance with an embodiment of the present invention. Node 24 comprises a processor 60, which performs the various processing functions of the node, and a network interface 62, which communicates with other nodes 24 in network 20.

In some embodiments, when two or more nodes 24 are arranged in a ring configuration (such as ring 26 in FIGS. 1 and 2 above) processor 60 of one of these nodes comprises a ring-level connection admission control (CAC) module 64, also referred to as a centralized CAC (CCAC) module. The CCAC module is responsible for performing ring-level resource allocation functions for the ring segments of ring 26.

Ring-level CAC functions include, for example, verifying that sufficient bandwidth is available in the ring segments to support a new connection at the desired quality of service, and performing bandwidth reservations for such connections in the nodes and segments belonging to the ring. For the sake of clarity, in the description that follows the CCAC module responsible for performing CAC functions for the nodes and segments belonging to ring 26 will be referred to as the CCAC module of ring 26.

Typically, processor 60 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, processor 60 may be implemented using a combination of hardware and software elements.

Figure 4:
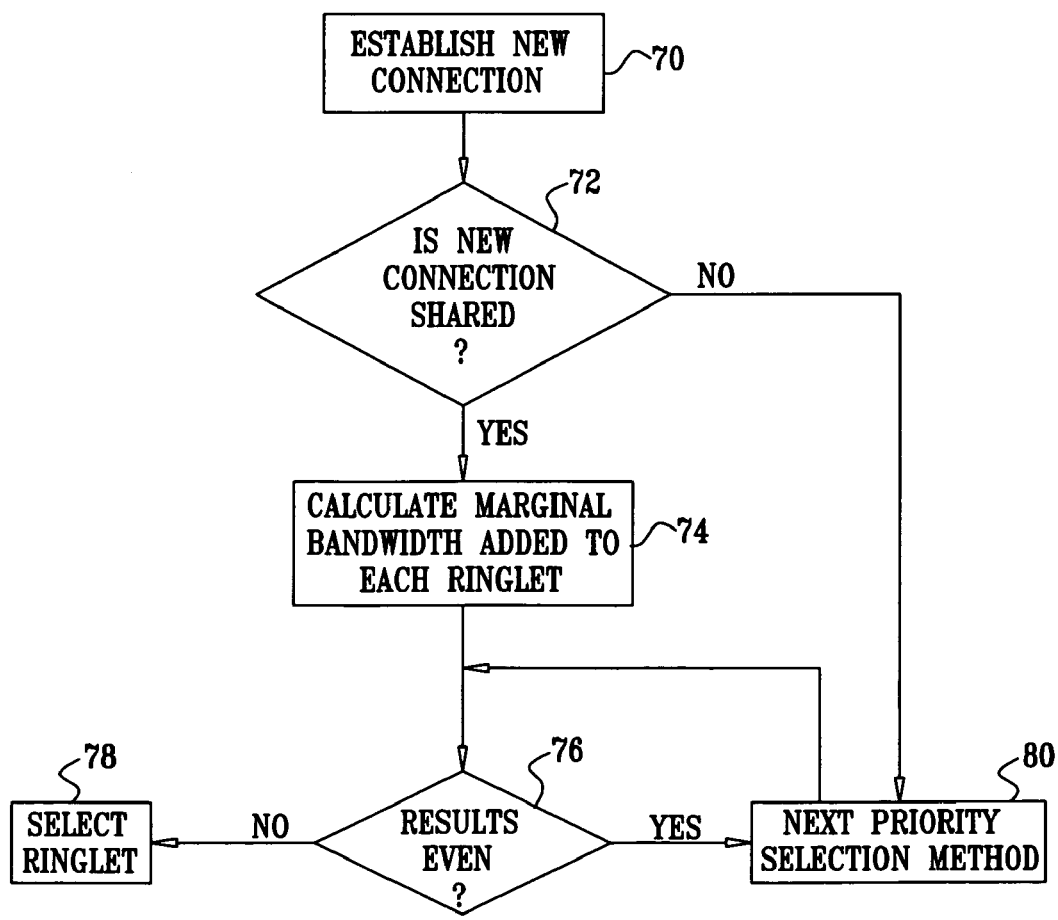
FIG. 4 is a flow chart that schematically illustrates a method for establishing a connection, in accordance with an embodiment of the present invention.

FIG. 4 is a flow chart that schematically illustrates a method for establishing a connection, in accordance with an embodiment of the present invention. The method is typically carried out by CCAC module 64 of ring 26. The method begins with CCAC module 64 initiating the establishment of a new connection, at a connection initiation step 70.

The CCAC module checks whether the new connection may share its bandwidth allocation with any of the existing connections that traverse ring 26, at a sharing checking step 72. In some embodiments, CCAC module 64 accepts an a-priori sharing definition, which defines connections traversing ring 26 that may share bandwidth allocations. Alternatively, the set-up procedure of the new connection may comprise a sharing definition stating other connections with which the new connection can share its bandwidth allocation.

In some embodiments, the sharing definition is distributed to nodes 24 using a signaling or reservation protocol, such as RSVP-TE and LDP cited above. The sharing definition is typically defined by an operator, such as a network administrator, as part of the network design. An exemplary method of defining the sharing of network resources and distributing the sharing definition to the network nodes is described in a U.S. patent application entitled "Resource Sharing among Network Tunnels," filed Dec. 15, 2005, which is assigned to the assignee of the present patent application and whose disclosure is incorporated herein by reference.

If the sharing definition states that the new connection may share its bandwidth allocation with at least one of the existing connections, CCAC module 64 determines which of the two candidate routes (i.e., the routes traversing clockwise ringlet 28 or counterclockwise ringlet 32 of ring 26) is to be used for the new connection. For each of the two ringlets, CCAC module 64 calculates the cumulative additional bandwidth reservation that would be allocated in the ring segments of ring 26 to the new connection, at a reservation calculation step 74. In some embodiments, prior to carrying out step 74, CCAC module 64 verifies that both ringlets have sufficient available bandwidth to support the new connection. If only one of the ringlets has sufficient bandwidth, this ringlet is selected by default.

In some embodiments, the cumulative additional bandwidth reservation is given by:

$$\Delta BW_{CW} = \sum_{S \in \left\{\begin{array}{c} \text{Clockwise ring} \\ \text{segments along} \\ \text{candidate route} \end{array}\right\}} (BW_{new}^S - BW_{existing}^S)$$

$$\Delta BW_{CCW} = \sum_{S \in \left\{\begin{array}{c} \text{Counter-clockwise ring} \\ \text{segments along} \\ \text{candidate route} \end{array}\right\}} (BW_{new}^S - BW_{existing}^S)$$

wherein $\Delta BW_{cw}$ and $\Delta BW_{ccw}$ denote the cumulative additional bandwidths on the clockwise and counter-clockwise ringlets, respectively.

The summation is performed over all ring segments S of the ringlet in question that belong to the candidate route traversing this ringlet. $BW_{new}^S$ denotes the bandwidth allocated in ring segment S to all connections including the new connection, taking in account bandwidth sharing, if the new connection were set up via the ringlet in question. $BW_{existing}^S$ denotes the bandwidth allocated in ring segment S to all previously-existing connections (excluding the new connection). Thus, the term $BW_{new}^S - BW_{existing}^S$ gives the additional bandwidth reservation for ring segment S.

When calculating $\Delta BW_{cw}$ and $\Delta BW_{ccw}$, CCAC module 64 considers only those connections that share their bandwidth with the new connection. In each ring segment, the CCAC module calculates the difference between the bandwidth allocated to these connections with and without the new connection. Parameter $\Delta BW_{cw}$ accumulates the extra bandwidth that would be allocated to the new connection in the ring segments of clockwise ringlet 28, if the new connection were to be established via this ringlet. Similarly, $\Delta BW_{ccw}$ accumulates the extra bandwidth that would be allocated to the new connection in the ring segments of counterclockwise ringlet 32. In particular, $\Delta BW_{cw}$ and $\Delta BW_{ccw}$ take into consideration that the new connection may share its bandwidth with at least one of the existing connections through ring 26.

CCAC module 64 compares the cumulative additional bandwidth reservation values of the two ringlets, at a ringlet comparison step 76. If the two values differ, CCAC module 64 selects the candidate route traversing the ringlet having the lower $\Delta BW$ value as a preferred route for establishing the new connection, at a ringlet selection step 78. For example, $\Delta BW_{cw} < \Delta BW_{ccw}$ means that the total extra bandwidth to be allocated due to the new connection is smaller in CW ringlet 28 than in CCW ringlet 32, and vice versa. In other words, a ringlet in which less bandwidth is consumed, taking into account bandwidth sharing, will have a lower $\Delta BW$ value.

If the outcome of ringlet comparison step 76 above is that $\Delta BW_{cw} = \Delta BW_{ccw}$, the method reverts to a lower priority selection method, at a next priority selection step 80. The method also reverts to step 80 from sharing checking step 72 above, if the new connection cannot share its bandwidth with any of the other connections.

The lower priority selection method may comprise any suitable method for choosing whether the preferred route for the new connection through ring 26 traverses CW ringlet 28 or CCW ringlet 32. For example, the lower priority selection method may maximize the average available bandwidth between the source and destination nodes of the new connection. The lower priority selection method may or may not take into consideration bandwidth sharing between the connections. In some embodiments, two or more lower priority selection methods can be used, in which case the method loops through steps 76 and 80 until a preferred route is selected.

Returning to the exemplary network configuration of FIG. 1 above, applying the method of FIG. 4 would provide the following results:

$$\Delta BW_{CW} = \Delta BW_{A \to B} + \Delta BW_{B \to C}$$
$$= (100 \text{ Mbps} - 100 \text{ Mbps}) + (50 \text{ Mbps} - 0 \text{ Mbps})$$
$$= 50 \text{ Mbps}$$
$$\Delta BW_{CCW} = \Delta BW_{A \to D} + \Delta BW_{D \to C}$$
$$= (50 \text{ Mbps} - 0) + (50 \text{ Mbps} - 0)$$
$$= 100 \text{ Mbps}$$

wherein $\Delta BW_{X \to Y}$ denotes the additional bandwidth that should be allocated to the new connection in the segment connecting node X to node Y, taking into account the ability to share bandwidth with the existing connection.

Therefore, candidate route 40 traversing CW ringlet 28 will be selected as the preferred route for the new connection that minimizes the consumed bandwidth. By contrast, methods that attempt to balance the bandwidth usage of the CW and CCW ringlets without considering bandwidth sharing would have chosen candidate route 44 instead, causing more bandwidth to be allocated.

In the exemplary network configuration of FIG. 2 above, applying the method of FIG. 4 would provide the following results:

$$\Delta BW_{CW} = \Delta BW_{A \to B} + \Delta BW_{B \to C}$$
$$= (1\text{ Gbps} - 0) + (1\text{ Gbps} - 0)$$
$$= 2\text{ Gbps}$$

$$\Delta BW_{CCW} = \Delta BW_{A \to F} + \Delta BW_{F \to E} + \Delta BW_{E \to D} + \Delta BW_{D \to C}$$
$$= (1\text{ Gbps} - 1\text{ Gbps}) + (1\text{ Gbps} - 1\text{ Gbps}) +$$
$$(1\text{ Gbps} - 1\text{ Gbps}) + (1\text{ Gbps} - 1\text{ Gbps})$$
$$= 0$$

Therefore, in this case candidate route 52 traversing CCW ringlet 32 will be selected as the preferred route for the new connection that minimizes the consumed bandwidth. By contrast, methods that attempt to maximize available bandwidth or to minimize the number or segments without considering bandwidth sharing would have chosen candidate route 56 instead, causing more bandwidth to be allocated.

Although the embodiments described herein mainly address route selection based on bandwidth sharing, the principles of the present invention can be used for selecting routes by considering the sharing of other network resources used to support and process connections. For example, shared resources may comprise resources of network nodes, such as memory space and ports. Additionally or alternatively to addressing ring configurations, the methods and systems described herein can be used to select routes in any suitable network configuration.

Further additionally or alternatively, the methods described herein can be used in conjunction with known routing protocols, which normally do not take bandwidth sharing into account. For example, in some network configurations network nodes report available bandwidth in network segments using a known layer 3 protocol such as OSPF-TE or IS-IS-TE. The reported bandwidth is then used to make routing decisions. In some embodiments, the network nodes can calculate and report the available bandwidth using the methods described hereinbelow, taking into consideration bandwidth sharing among connections. Thus, the resulting routing decisions will implicitly depend on bandwidth sharing, enabling better use of network resources. Similarly, the methods and systems described herein can be used to enhance other bandwidth-related routing protocols by taking into consideration bandwidth sharing among connections.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for establishing a connection through a communication network that includes multiple segments, comprising:
   identifying two or more candidate routes for a new connection having a requested bandwidth to be established through the network;
   providing a sharing definition specifying one or more other connections, which have respective bandwidths and which are permitted to share a bandwidth allocation with the new connection, such that a total bandwidth allocated jointly to the new connection and to the other connections in any given segment is equal to a maximum of the requested bandwidth and of the bandwidths of the other connections in the given segment;
   for each of the two or more candidate routes, calculating a cumulative additional bandwidth reservation to be allocated to the new connection in the segments along the candidate route, responsively to the sharing definition;
   selecting a preferred route having a minimum value of the cumulative additional bandwidth reservation out of the two or more candidate routes; and
   establishing the new connection using the preferred route.

2. The method according to claim 1, wherein at least some of the segments are arranged in a ring configuration, and wherein identifying the two or more candidate routes comprises identifying first and second routes traversing respective first and second ringlets of the ring configuration.

3. The method according to claim 1, wherein establishing the new connection comprises establishing a tunnel through the network in accordance with a tunnel-based communication protocol.

4. The method according to claim 1, wherein the new connection and at least one of the other connections specified in the sharing definition traverse at least one common segment along the preferred route, and wherein establishing the new connection comprises allocating the maximum of the requested bandwidth and of the bandwidths of the at least one of the other connections in the at least one common segment to the new connection and to the at least one of the other connections.

5. The method according to claim 4, wherein the new connection and the at least one of the other connections are established to protect one another against a failure in at least one of a network segment and a network node.

6. The method according to claim 1, wherein providing the sharing definition comprises distributing the sharing definition to nodes of the network using a reservation protocol.

7. The method according to claim 1, wherein selecting the preferred route comprises reverting to a lower priority route selection method when the calculated cumulative additional bandwidth reservation is equal for all of the two or more candidate routes.

8. A network node, comprising:
   a network interface, which is arranged to communicate with other network nodes over a communication network that includes multiple segments; and
   a processor, which is arranged to identify two or more candidate routes for a new connection having a requested bandwidth to be established through the network, to accept a sharing definition specifying one or more other connections, which have respective bandwidths and which are permitted to share a bandwidth allocation with the new connection such that a total bandwidth allocated jointly to the new connection and to the other connections in any given segment is equal to a maximum of the requested bandwidth and of the bandwidths of the other connections in the given segment, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

9. The node according to claim 8, wherein at least some of the segments are arranged in a ring configuration associated with the node, and wherein the processor comprises a ring-level connection admission control (CAC) module, which is arranged to identify first and second candidate routes traversing respective first and second ringlets of the ring configuration, and to select the preferred route traversing one of the first and second singlets.

10. The node according to claim 8, wherein the new connection comprises a tunnel established through the network in accordance with a tunnel-based communication protocol.

11. The node according to claim 8, wherein the new connection and at least one of the other connections specified in the sharing definition traverse at least one common segment along the preferred route, and wherein the processor is arranged to allocate the maximum of the requested bandwidth and of the bandwidths of the at least one of the other connections in the at least one common segment to the new connection and to the at least one of the other connections.

12. The node according to claim 11, wherein the new connection and the at least one of the other connections are established to protect one another against a failure in at least one of a network segment and a network node.

13. The node according to claim 8, wherein the processor is arranged to accept the sharing definition using a reservation protocol.

14. The node according to claim 8, wherein the processor is arranged to revert to a lower priority route selection method when the calculated cumulative additional bandwidth reservation is equal for all of the two or more candidate routes.

15. A communication network, comprising:
a plurality of network segments;
a network node, comprising:
a network interface, which is arranged to communicate with other nodes in the network; and
a processor, which is arranged to identify two or more candidate routes for a new connection having a requested bandwidth to be established through the network, to accept a sharing definition specifying one or more other connections, which have respective bandwidths and which are permitted to share a bandwidth allocation with the new connection such that a total bandwidth allocated jointly to the new connection and to the other connections in any given segment is equal to a maximum of the requested bandwidth and of the bandwidths of the other connections in the given segment, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

16. The network according to claim 15, wherein at least some of the segments are arranged in a ring configuration associated with the network node, and wherein the processor comprises a ring-level connection admission control (CAC) module, which is arranged to identify first and second candidate routes traversing respective first and second ringlets of the ring configuration, and to select the preferred route traversing one of the first and second ringlets.

17. A computer software product used in a network node in a communication network that includes multiple segments, the product comprising a tangible storage medium, in which program instructions are stored, which instructions, when read by a computer, cause the computer to identify two or more candidate routes for a new connection having a requested bandwidth to be established through the network, to accept a sharing definition specifying one or more other connections, which have respective bandwidths and which are permitted to share a bandwidth allocation with the new connection such that a total bandwidth allocated jointly to the new connection and to the other connections in any given segment is equal to a maximum of the requested bandwidth and of the bandwidths of the other connections in the given segment, to calculate for each of the two or more candidate routes a cumulative additional bandwidth reservation to be allocated to the new connection in the segments along the candidate route, responsively to the sharing definition, to select a preferred route having a minimum value of the cumulative additional bandwidth reservation out of the two or more candidate routes, and to establish the new connection using the preferred route.

18. The product according to claim 17, wherein at least some of the segments are arranged in a ring configuration associated with the node, and wherein the instructions cause the computer to identify first and second candidate routes traversing respective first and second ringlets of the ring configuration, and to select the preferred route traversing one of the first and second ringlets.

19. The product according to claim 17, wherein the new connection comprises a tunnel established through the network in accordance with a tunnel-based communication protocol.

20. The product according to claim 17, wherein the new connection and at least one of the other connections specified in the sharing definition traverse at least one common segment along the preferred route, and wherein the instructions cause the computer to allocate the maximum of the requested bandwidth and of the bandwidths of the at least one of the other connections in the at least one common segment to the new connection and to the existing connection.

* * * * *